United States Patent [19]

El-Nokaly

[11] Patent Number: 5,106,644

[45] Date of Patent: Apr. 21, 1992

[54] FOOD PRODUCTS CONTAINING REDUCED CALORIE, FIBER CONTAINING FAT SUBSTITUTE

[75] Inventor: Magda El-Nokaly, Cincinnati, Ohio

[73] Assignee: Procter & Gamble Company, Cincinnati, Ohio

[21] Appl. No.: 529,027

[22] Filed: May 25, 1990

[51] Int. Cl.$^5$ .................. A23D 7/00; A23D 10/00; A21D 10/00

[52] U.S. Cl. .................. 426/603; 426/554; 426/611

[58] Field of Search .............. 426/601, 602, 610, 531, 426/554, 611, 804, 603

[56] References Cited

U.S. PATENT DOCUMENTS

| | | | |
|---|---|---|---|
| 4,226,890 | 10/1980 | Howard | 426/92 |
| 4,378,381 | 3/1983 | Turbak et al. | 426/601 |
| 4,981,709 | 1/1991 | Furcsik et al. | 426/80 X |

FOREIGN PATENT DOCUMENTS

| | | |
|---|---|---|
| 53-082505 | 7/1978 | Japan . |
| 59-032342 | 3/1981 | Japan . |
| 56-109966 | 7/1981 | Japan . |
| 59-072173 | 4/1984 | Japan . |
| 59-072174 | 4/1984 | Japan . |
| 59-181680 | 8/1984 | Japan . |
| 61-281182 | 12/1986 | Japan . |
| 1346756 | 2/1974 | United Kingdom . |

OTHER PUBLICATIONS

Marchessault et al. (Nature, 184, 632,633 (1956).
Chanzy and Peguy, J. Polymer Sci., 18, 1137-1144 (Polymer Physics Edition, 1980).
Conio et al., J. Polymer Sci., 22, 273-277 (Polymer Letters Edition, 1984), pp. 78-93.
Fortin et al., Macromolecules, 22, (5) 2286-2292 (1989).
Hennock et al., "Effect of Xanthan Gum on the Rheology and Stability of Oil-Water Emulsions", J. Food Sci., vol. 49, No. 5, pp. 1271-1274 (1984).
Hitaka, "Food Emulsifiers—Liquid Crystals and Phase Diagrams", Yushi, vol. 37, No. 8, pp. 66-70 (1984).
Ganz, "Some Effects of Gums Derived from Cellulose on the Texture of Foods", Cereal Sci. Today, vol. 18, No. 12, pp. 398-403, 415, 416 (1973).
Moore, "Nongelling Microcrystalline Cellulose Offers Superior Texture to Heat Sensitive Liquid Emulsions", Food Product Dev., vol. 12, No. 6, p. 38 (1978).
Hemkar, "Associative Structures of Polyglycerol Esters in Food Emulsions", JAOCS, Feb., 1981, pp. 114-119.
Kamide et al., "Formation of Lyotropic Liquid Crystals of Cellulose Derivatives Dissolved in Inorganic Acids", Polymer Journal, vol. 18, No. 3, pp. 273-276 (1986).
Werbowyi et al., "Liquid Crystalline Structure in Aqueous Hydroxypropyl Cellulose Solutions", Mol. Cryst. Liq. Cryst., vol. 34, pp. 97-103 (1976).
Bheda et al., "Phase Behavior and Structure of Liquid Crystalline Solutions of Cellulose Derivatives", Colloid & Polymer Sci., vol. 258, No. 12, pp. 1335-1342 (1980).
Gray, "Chemical Characteristics of Cellulosic Liquid Crystals", Faraday Diss. Discuss. Chem. Soc., vol. 79, pp. 257-264 (1985).
Bheda et al., "Cellulose Derivative Liquid Crystals and Their Application", Tech. Pap. Reg. Tech. Conf.-Soc. Plast. Eng., pp. 321-323 (1980).
Salamone et al., "Xanthan Gum-A Lyotropic, Liquid Crystalline Polymer and Its Properties as a Suspending Agent", Soc. Pet. Eng. J., vol. 22, No. 4, pp. 555-556 (1982).

Primary Examiner—Donald E. Czaja
Assistant Examiner—Helen Pratt
Attorney, Agent, or Firm—Rose A. Dabek; Jerry J. Yetter; Richard C. Witte

[57] ABSTRACT

Reduced calorie, fiber containing food products containing a fat substitute are disclosed. The fat substitute is made of a fat or oil and polymeric liquid crystal prepared from a polysaccharide and a solvent, preferably water. This fat substitute can be used to replace fat in a variety of food products.

26 Claims, No Drawings

FOOD PRODUCTS CONTAINING REDUCED CALORIE, FIBER CONTAINING FAT SUBSTITUTE

FIELD OF THE INVENTION

This invention relates to food products containing a reduced calorie, fiber containing fat substitute composition, and more particularly to foods wherein from 0.5% to 100% of the fatty material in the food is replaced with polymeric liquid crystals prepared from a polysaccharide and a solvent, preferably water.

BACKGROUND OF THE INVENTION

Excess weight has been recognized as a major health problem, particularly in the industrialized nations. Another significant problem is high cholesterol levels in the blood stream. These problems are due in large part to consumption of more calories than are expended. Fats and oils are the most concentrated form of energy in the diet, with each gram supplying approximately nine calories. It has been estimated that fats constitute, on average in the U.S., about 40% of the total calories in the diet. The recommended level is less than 30% of total calories.

The sources of fats in the diet are many and varied. Such foods include baked products, candies, icings and frostings, salad dressings, shortening, butter, sour cream, margarine, peanut butter and other nut spreads and processed meats and meat analogs. A significant portion of the fat in these products is provided in the form of a liquid oil a solid fat or a shortening. It is desirable to reduce the levels of fat and calories in foods. It is also desirable to reduce the level of saturated medium and long chain ($C_{12-20}$) fats, in contrast to unsaturated fats which are believed to be healthier. Fat level is best reduced with low or insignificant deleterious effects on the baking and cooking properties of the food, its taste, and its mouth feel characteristics.

Recently, the importance of adding fiber to the diet to lower blood cholesterol levels has been stressed. Adding fibers, even in finely ground or particulate form can give a gritty feel to the fat and make it taste "sandy" or lumpy. A fat replacement which would add fiber to the food in a manner which is not gritty or palpable is also desirable.

One way to add fiber and water to fat is through a gel. The addition of both fiber and water lowers the calories of the food since they ordinarily replace higher calorie ingredients such as starch, sugar and fat. Gels made from polysaccharides and polar solvents, while not being gritty, do not mix well with edible fat and, consequently, tend to remain in clumps or droplets of gel in solid fats. Gels can also taste slimy. Also, for gels in general, a relatively high degree of syneresis can occur over time, thereby resulting in a separate liquid phase. This liquid phase may not be miscible with certain product compositions.

A second way of adding fibers or polysaccharides to a food is through microparticulation of a gel. Microparticulation requires extensive processing to keep the microparticulated fiber or polysaccharide in a form which will remain separated in the food; i.e. it does not coalesce.

Other ways of incorporating water and synthetic fats have been through the use of emulsifiers which make water in oil or oil in water emulsions. Emulsions are made of two immiscible liquids. These emulsions can break down during the cooking or baking of the product and also can separate during storage.

It has now been discovered that certain liquid crystals, i.e., polymer liquid crystals can be made which incorporate (fiber) polysaccharides, water and fat into foods.

The liquid crystalline state exists between the boundaries of the solid phase and the isotropic liquid phase (i.e. an intermediate between the three dimensionally ordered crystalline state and the disordered dissolved state). In this state some of the molecular order characteristics of the solid phase are retained in the liquid state because of the molecular structure and short range intermolecular interaction. The ability of some compounds to form a liquid crystalline mesophase had been observed nearly a century ago. Since that time many compounds exhibiting liquid crystalline properties have been synthesized. D. Sek: Structural variations of liquid crystalline polymer macromolecules; *Acta Polymerica*, 39 (1988) Nr. 11, p.599.

Low molecular weight organic surface active compounds (emulsifiers) are distinguished from polymers. The latter comprise large molecules made up of repeating units while the former are low molecular weight compounds. Physically and chemically, these two subclasses of materials are different from each other.

Low molecular weight liquid crystals, i.e. liquid crystals formed from a low molecular weight emulsifier or organic amphiphile (a compound having both a polar and a non-polar group, as a soap or long chain fatty acid monoglyceride) are metabolized and therefore contribute calories. Also, because of their weight, they are added at higher concentrations to achieve the same functionality as polymer liquid crystals. On the other hand, polymer liquid crystals are made of a polymer and a solvent. The polymers can be a long chain of repeating units of amphiphiles or polymerized low molecular weight materials. They also form different types of liquid crystals.

In the literature, liquid crystals are also referred to as anisotropic fluids, a fourth state of matter, polymer association structure or mesophases. Those terms are used interchangeably. The term "polymer liquid crystals" as used herein means "polymeric lyotropic liquid crystals" unless otherwise specified. The term "lyotropic" means a liquid crystalline system containing a solvent. This type of liquid crystal is distinguished in the art from thermotropic, heat, and magnetically induced liquid crystals. Suitable polymers can have either a non-amphiphilic or an amphiphilic structure. The same compound can form lyotropic and thermotropic liquid crystals. Lyotropic liquid crystal systems also can show thermotropic behavior.

A general description of the phase behavior of a soluble polymer in a solvent is as follows: (I) The polymer dissolves in the solvent to form an isotropic polymeric solution. (II) When the concentration of the polymer increases, a mixture of isotropic polymeric solution+-liquid crystals is formed. (III) When the level of the polymer increases further and the required mixing is applied, a homogeneous single-phase liquid crystal range is induced. (IV) When even more polymer is present, a mixture of liquid crystals and crystalline polymer forms. (V) When extremely large amounts of polymer are present a crystalline and/or partially crystalline phase are present.

It is important to understand that liquid crystals are substances that possess mechanical properties resembling those of fluids yet are capable of transmitting polarized light (birefringence) under static conditions. In some cases they may show Bragg reflections characteristic of a well-defined molecular spacing. They have high degrees of orientational order and chain extensions.

Polymeric lyotropic liquid crystals are subdivided into three subclasses: I. nematic, II. cholesteric, and III. smectic, which are optically anisotropic. See J. H. Wendorff. in *"Scattering in Liquid Crystalline Polymer System"* in *"Liquid Crystalline Order in Polymers,"* A. Blumstein (ed.), Academic Press, Chapter 1 (1978).

I. In the nematic liquid crystalline phase the centers of gravity of the polymeric particles are arranged at random, consequently no positional long range order exists. Within volume elements of a macroscopic sample, the axes of all particles are oriented in a specific direction. Near the smectic-nematic transition temperature, there may be an additional ordering (positional order).

II. The cholesteric liquid crystalline phase is often thought of as a modification of a nematic phase. since its molecular structure is assumed to be similar to the latter. No positional order but only an orientational order exists in the cholesteric phase. In contrast, however, to the nematic phase, the cholesteric phase is characterized by the fact that the direction of the long axes of the molecules change continuously within the sample. This leads to a twist about an axis perpendicular to the long axes of the molecule.

III. In the smectic phases the centers of gravity of the elongated molecules are arranged in equidistant planes and smectic layers are formed. The planes are allowed to move perpendicularly to the layer normal and within the layers different arrangements of the molecules are possible. The long axes of the molecules can be parallel, normal or tilted with respect to the layer. A two-dimensional short range order or a two-dimensional long range order can exist within the smectic layers. The smectic modifications are labeled according to the arrangement of the particles within the layers.

Investigations of miscibility between different liquid crystalline modifications allow the distinction between various smectic phases and between smectic, cholesteric and nematic phases.

The light microscopy of liquid crystals is described in *The Microscopy of Liquid Crystals*, Norman Hartshorne, Microscopy Publications, Ltd., Chicago, Ill., U.S.A., 1974. Birefringence occurs in general for mesomorphic states. Methods for microscopic observation and evaluation are discussed in Chapter 1, pp. 1-20, and cholesteric mesophas (liquid crystal) systems are discussed in Chapter 6, pp. 79-90. A preferred method for determining occurrence of liquid crystals is by observing birefringence of thin liquid crystal films between glass slides or from thin slices of a material under a polarizing microscope.

Focusing on the polymeric lyotropic liquid crystals of the present invention, in general, they are prepared by mixing the polymer with a sufficient amount of a solvent within the critical concentration and temperature ranges. The polymeric liquid crystalline phase flows under shear and is characterized by a viscosity that is significantly different from the viscosity of its isotropic solution phase. In other words, for some polymers, as the concentration increases, the viscosities of the polymer/solvent mixture increases until it reaches a viscosity peak. Then the viscosity decreases dramatically. The presence of such viscosity peaks signifies the onset of, or the presence of, a polymeric lyotropic liquid crystalline order. Hence, liquid crystals are distinguishable from polymeric systems which are isotropic solutions, pure solids, simple mixtures of solids and liquids and rigid isotropic polymeric gels. Rigid gels do not flow under shear like liquid crystals. Also, when viewed with a polarized light microscope, liquid crystals show identifiable birefringence, as, for example, planar lamellar birefringence, whereas when isotropic solutions and rigid gels are viewed under polarized light, both show dark fields.

Liquid crystal xanthan gum (a polymer) is reported to stabilize an oil-in-water emulsion (Biological Abstract 79:12413. Food Research Institute, Norwich, U.K. and M. Hennock et al., *J. Food Sci.,* 49, 1271, (1984). However, specific applications in foods are not disclosed.

Adding isotropic solutions of the polysaccharide in polar solvent to a fat would lead to unacceptable results. If the polysaccharide were soluble in the solvent, it would not be gritty, but the solvent nevertheless would not mix well with the fats. The solution would be expected to separate from the fat during storage or use. Flowable polysaccharide liquid crystals, on the other hand, allow substantial amounts of polysacchride to be incorporated in a fat. Such mixtures can substitute for fats in a variety of edible, fat-containing products without suffering the drawbacks of non-liquid crystal technology, i.e. gritty taste, separation or syneresis.

It is an object of this invention to provide edible compositions containing a fat replacement for all or part of the fat in a food product without significant deleterious effect on the cooking, taste, or mouth feel characteristics of foods made with this fat replacement.

It is particularly desirable that the fat substitute composition be made from ingredients that are presently used and approved for use in edible product applications. approved for use It is also an object of this invention to provide a fiber additive to the food without affecting the mouth feel and taste of the product.

It is also an object of this invention to provide a fat substitute which can be made with a minimum of processing and which is easily mixed with the food.

It has now been found that the above objects, as well as other benefits, can be attained by substituting liquid crystals formed from polysaccharides and solvents for fat conventionally present in certain foods.

SUMMARY OF THE INVENTION

The present invention relates to a food containing a solid material in which from 0.5% to 100% of the fat or oil has been replaced with a fat substitute comprising:
(a) from about 5% to about 99.5% of a lipid; and
(b) from about 0.5% to about 95% of a stable polymeric liquid crystal consisting essentially of:
  (1) from about 10% to about 90% of a solvent; and
  (2) from about 10% to about 90% of a polysaccharide having a molecular weight of from about 500 to about 1,000,000.

It has been found that significant reductions in the fat and caloric content of fat-containing foods can be made by substituting polymeric liquid crystalline fat substitutes of the present invention for a portion of the fat in fat-containing food products. These advantages can be attained while still retaining desirable taste, mouth feel, and cooling characteristics of both uncooked and a variety of cooked foods.

Without intending to necessarily limit the scope of the invention, it is believed that the polymeric polysaccharide liquid crystal adsorbs onto solid/liquid, solid/gas, liquid/gas or liquid/liquid interfaces in heterogeneous food systems such as solid fats in shortening (liquid/solid) and on air bubbles in frosting, mousses, cakes leavened baked goods (liquid/gas or solid/gas). A liquid crystalline lamellae forms in the continuous phase. These liquid crystalline layers are able to flow under shear and act as lubricants between the different components of the heterogeneous food systems such as the solids and other materials in the product. They also stabilize those systems by entrapping the liquid, air or solids particles or droplets in their matrix and preventing them from flocculating and further coalescing (for further explanation see "Effect of Xanthan Gum upon the Rheology and Stability of oil/water Emulsion", *J. Food Sci.*, ibid, 1274.

The fat substitutes of the present invention can be used in a wide variety of culinary products including, but not limited to, shortening, butter, margarine, frosting and icing, baked (or microwaved) flour- and dough-based products. The fat substitutes can be used in combination with fats in shortening and other cooking fat products for baking, microwaving, broiling, roasting, pan frying, deep frying, and other types of stove top or open fire cooking. Care should be taken to select a polysaccharide which will not char at the temperatures to which it will be exposed in the case of deep frying and other high temperature cooking operations.

An additional benefit of the stable polymeric liquid crystal fat substitutes of the present invention is that they can stabilize heterogeneous systems. With respect to baked flour- or dough-based products such as cakes, cookies, crackers, brownies, breads, muffins, biscuits, and the like, better shape in the baked product is achieved as are better crumbs and dough or batter stability. The liquid crystals in the fat substitute systems herein can exist at the interface of a foam, emulsion or dispersion. That is, they can exist at the interface of a liquid/liquid system (emulsion), a solid/liquid system (dispersion) or a gas/liquid or gas/solid system (foam). Compared to control products made with an equivalent weight of conventional cooking fats, the liquid crystal-containing cooking fat compositions of the present invention can provide the baked products with reduced edge shrinkage and improved ability of risen portions of the product to resist collapse, particularly the center regions of the products. With respect to non-rising dough products, such as pie crust, the liquid crystal-containing cooking fat compositions can provide improved freeze-thaw stability, less shrinkage on baking and preventing oil separation.

The polymer liquid crystals can be used to reduce the amount of fat in a variety of foods with adsorption surfaces for the liquid crystals other than, or in addition to, solid fats. In such products, the level of liquid fats (i.e., oils) can be reduced through the use of the present fat substitutes. These include a variety of protein-containing food products which naturally and/or conventionally include liquid fats. Such proteins include a variety of vegetative proteins such as those found in soybeans and other beans or oilseeds, peanuts, sesame seeds, sunflower seeds, Brazil nuts, hazel nuts, almonds, walnuts, pumpkin seeds, macadamia nuts, and filberts. Processed foods made from these protein sources include processed meats and textured proteins which are meat analog or cheese substitutes, as well as peanut butters and spreads.

The present invention, accordingly, relates to edible protein- and oil-containing compositions which comprise from about 90% to about 25% of a protein component, from about 10% to about 75% of a fat substitute which consists essentially of from about 10% to about 75% of an oil, and from about 5% to about 75% of an edible, polymeric polysaccharide liquid crystal. It has been found that the amount of oil in these protein-containing products can be reduced while still retaining good mouthfeel and taste characteristics by substituting a portion of the oil with said polysaccharide liquid crystal. Liquid crystals give fluidity and flowability to the defatted protein particles.

Yet another benefit of the present invention is the capability of the polysaccharide liquid crystal to encapsulate or trap flavors, colors, nutrients, drugs, vitamins, preservatives, etc. which are soluble in the solvent or can form liquid crystals with the polysaccharide such as peppermint oil. These soluble materials can be evenly distributed throughout the compositions of the present invention by virtue of the ability of the liquid crystal to be microscopically distributed throughout the product. Yet, since said materials are encapsulated between layers of the liquid crystal, they are storage stable.

DETAILED DESCRIPTION OF THE INVENTION

As used herein, the term "lipid" includes both fat and synthetic fat.

As used herein, term "fat" shall include both solid fats (m.p. above 20° C.) and liquid fats (i.e., oils) unless otherwise specifically indicated. Fats and oils are generally recognized to be fatty acid triglycerides which are either naturally occurring in vegetable and animal fats and oils, but also include rearranged or randomized fats and oils and interesterified fats and oils.

As used herein, the term "synthetic fat" refers to any synthetic triglyceride materials and also fat substitutes such as polyol polyesters and polycarboxylic acid esters. These synthetic fats generally act as fat substitutes in food compositions.

As used herein, the term "solid material" refers to any solid food ingredient which is capable of adsorbing onto the polymeric liquid crystal. Solids include starches, modified starches, celluloses, modified celluloses, polydextroses, proteins, solid fats and sugars.

As used herein, the term "polysaccharide" refers to a material which is made up of more than ten (10) glucose units in either an alpha (starch) or a beta (cellulose) form or other monosaccharides, e.g., mannose. These polysaccharides can be modified. Polysaccharides are described in detail below.

The stable polymeric liquid crystal comprises a solvent, preferably a polar solvent like water, and a polysaccharide (hereinafter referred to interchangeably as the "liquid crystal polymer") present at the appropriate relative concentration level such that the liquid crystalline state is substantially one phase and is a polymeric liquid crystalline state. A variety of polysaccharides can be used including extracellular gums and cellulosic derivatives. The liquid crystal polymer can have a wide range of molecular weights, typically between about 500 and about 1,000,000. An average molecular weight of between about 750 and about 200,000 is preferred, between about 1,000 and about 100,000 being more preferred. The molecular weight of the polysaccharides as used herein is an average molecular weight. In addition to the molecular weight, the viscosity can be used to characterize the polymer.

The liquid crystal polymer must also be sufficiently soluble in the solvent such that a liquid crystalline state can be formed at the temperature conditions of the product preparation will be made and, in the typical case, use conditions. Additionally, the liquid crystal polymer should be of a type which has the capability to flow under application of shear. Without necessarily limiting the invention, it is believed that the preferred polymers form cholesteric liquid crystals.

The present invention relates to foods which can be physically heterogeneous or homogeneous as follows:

I. Heterogeneous Foods comprise varied components or ingredients in different state or forms, i.e. liquid, gas and solids. Heterogeneous food systems contain various possible interfaces between their different components: i.e., solid/liquid (S/L); solid/gas (S/G); liquid/liquid (L/L); liquid/gas (L/G) or solid/solid (S/S). Examples of solids are solid fat, protein, sugars, flour, starch, modified starch or cellulose. Examples of liquids are oils, water, liquid fats and solutions. Examples of gases are air, carbon dioxide or nitrogen. The various interfaces serve as an adsorption site for the flowable polymeric liquid crystals or the polymeric polysaccharide liquid crystal/fat substitute. The following are examples of food products containing these interfaces:

Shortening—physical composition: solid and liquid fat
  type of interface: S/L
Cakes—physical composition of batter: solid fat, sugar and flour; liquid water or oil; and air
  type of interface: S/L and S/G
Frosting, mousse, whipped cream—physical composition: solid and liquid fat or oil and air
  type of interface: S/L, S/G and L/G
Salad Oil—physical composition: two immiscible liquids (oil and water)
  type of interface: L/L
Margarine—physical composition: liquid and solid fat or oil and emulsifiers and water
  type of interface: L/L and L/S.

II. Homogeneous Foods are of two types:
(i) those in which one component of the food is in one physical form, i.e. single phase, as for example liquid oil or solid flour only.
(ii) those in which there are multiple components in one physical form or single phase as for example, an oil solution of beta-carotene, or a sugar or salt water solution.

The effect of polymer liquid crystals on homogeneous foods will depend on the concentration, physical state and type of food.

Water

Water can dilute polysaccharide liquid crystals out of its liquid crystalline phase into the isotropic phase. For example, the onset of a one phase liquid crystalline Klucel E is about 47% Klucel in water (Conio, et al., *Macromolecules*, 16, (8), 1265 (1983).) Adding more water to 47% Klucel E liquid crystals will shift the concentration towards the biphasic system of liquid crystals and isotropic solution (39% to 47%). Increasing the water, even more will lead to the isotropic phase (see Cunio phase diagrams, p 1266). Thus only concentrated liquid crystals can be diluted within their liquid crystalline phase boundaries.

Oil

Liquid crystals have to be mechanically dispersed in liquid oil using a micro-fluidiser, mixers, etc. Such systems have the advantage that water is dispersed in the oil through the liquid crystals, i.e., water is not available to separate upon standing as in an emulsion.

Solid Components

Solids, such as starch, flour, solid fat, proteins, etc., mix with polysaccharide liquid crystals to make an essentially homogeneous mix. Under polarized light microscopy a sample of polysaccharide liquid crystals and modified starch appears homogeneous. In other cases, there is no apparaent difference between the control (without liquid crystals) and the sample containing liquid crystals. Examples of such mixtures include solid fats and peanut butter. Care has to be taken in certain cases that the solid does not compete with the polysaccharide for its water. An example of such a behavior is if a polysaccharide liquid crystal is added as such to defatted peanut protein, the liquid crystals break down. To avoid such a behavior and to stabilize liquid crystals, sugars, polyols or humectants are dissolved in the water from which the liquid crystals are formed. Then the polysaccharide liquid crystals are added to the protein. The presence of molasses, honey or sugars in the system can be an alternative solution to prevent such a competition for the water between the protein and the polysaccharide.

The addition of such polysaccharide liquid crystals can change the texture, rheology and functionality of those compounds.

PREPARATION OF THE FAT SUBSTITUTE

The fat substitute is made by preparing a polymeric liquid crystal from a solvent and a polymeric polysaccharide. This polymeric liquid crystal can be formed separately and added to the food, or, in the case of shortenings and other systems where there is no competition for the water of the liquid crystal, it can be created in situ. If there is competition for the water, liquid crystals can also be created in situ after calculating the total amount of water needed to satisfy all of the components of the system.

1. Polymeric Polysaccharide Liquid Crystal

The polymeric polysaccharide liquid crystal component comprises an edible solvent and an edible polysaccharide polymer. In general, the polysaccharides useful for the present invention are soluble in the solvent and form lyotropic mesophases, (i.e., form anisotropic states in solution) characterized by the alignment of molecules. Because the molecules are aligned, they flow one over the other and thus the liquid crystals flow under application of shear. Liquid crystals are easily oriented by surfaces, electromagnetic files and mechanical stress or shear, and the degree of orientation affects their viscosity. The rheological behavior of a liquid crystal is known to be greatly dependent on the nature and also on the texure of the mesophase.

One type of liquid crystal structure which many of the applicable polysaccharides can form is known in the liquid crystal art as a cholesteric liquid crystal. However, it is not necessarily intended to limit the scope of the present invention to liquid crystals that can be verified as specifically falling into the cholesteric category. Rather, flowable polymeric polysaccharide liquid crystals which meet the chemical and analytical requirements set forth herein are meant to be encompassed.

In general, polysaccharides which form liquid crystals are characterized as having rigid or semi-rigid backbones. See, for example, P. Weigel et al., incorporated herein by reference above, and F. Fried and P. Sixou, "Lyotropic Mesophases of Hydroxypropylcellulose in Pure Acetic Acid, in Water, and in Mixed Solvents," *J. of Polymer Science & Polymer Chemistry Edition*, Vol. 22, 239-247 (John Wiley & Sons, Inc., 1984), incorporated by references herein. It is not intended, however to necessarily limit the invention by type of polysaccharide polymer backbone, or to necessarily exclude polymers with flexible backbones.

A. Polysaccharide Polymer

A variety of polysaccharide polymers can be used. The polymers can have molecular weights of from about 500 up to or in excess of about 1,000,000; however, lower molecular weight polymers within the range of about 750 to about 500,000 are preferred, molecular weights of between about 1,000 and about 60,000 are more preferred.

Polysaccharides useful for the present invention include a wide variety of polysaccharides, including polyglucose materials, gums, hydrocolloids, cellulose and cellulose-derivative polymers. Gums are plant or microbial (extracellular polysaccharides) derived materials which are modified polysaccharides, but which have achieved their own terminology in the art. Many of these and other suitable polysaccharides are described in more detail in *Industrial Gums—Polysaccharides and Their Derivatives*, Roy L. Whistler, editor, Academic Press (New York), 1959, incorporated by reference herein, and also in P. Weigel et al., "Liquid Crystalline States in Solutions of Cellulose and Cellulose Derivatives," Acta Polymerica, Vol. 35, No. 1, 1984, pp. 83-88, also incorporated by reference herein.

Useful polysaccharides include nonionic, anionic and cationic polysaccharides. Preferred nonionics include the hydroxypropyl cellulose polymers known as the KLUCEL series available from Hercules, Inc. of Naplesville, Ill., USA and xanthan gum available from Kelco, San Diego CA. Some preferred anionic polymers are the sodium alginates (commercially available from Kelco, of San Diego, CA) and the sodium carboxymethylcellulose polymers available from Hercules. Some preferred cationic polymers are Chitosan TM and Chitin TM from Protan, Inc., Redmond, Wash. These cationic materials are not yet approved for food use.

B. Solvent

The solvents useful for the polysaccharide liquid crystals of the present invention include any solvent acceptable for human ingestion which is capable of dissolving the polysaccharide. Preferably the solvent is a polar solvent. Suitable solvents include: water; low molecular weight carboxylic acids, e.g. acetic acid, propionic acid, butyric acid; medium and long chain saturated and unsaturated carboxylic acids, e.g. linoleic acid, decanoic acid, oleic acid; alcohols, such as ethanol, propyl alcohol, isopropyl alcohol, hexanol; polyols, such as propylene glycol and glycerine; flavor oils, and mixtures thereof. Water and water mixtures of these solvents are preferred.

Flavor oils such as peppermint oil, orange oil, citrus oil, wintergreen oil can be used. Flavor oils are usually mixed in a solvent such as ethanol to dilute the flavor. The flavor oils useful herein can be derived from natural sources or be synthetically prepared. Generally flavor oils are mixtures of ketones, alcohols, fatty acids, esters and terpenes. The term "flavor oil" is generally recognized in the art to be a liquid which is derived from botanical sources, i.e. leaves, bark, or skin of fruits or vegetables, and which are usually insoluble in water.

Additionally, the solvents utilized to form polysaccharide liquid crystals can optionally have other soluble additives, including: salts, e.g., sodium chloride and potassium chloride; nonpolymeric saccharides such as mono-, di-, and oligosaccharides, e.g., honey, sucrose, and fructose; flavors; food colors; vitamins; minerals; drugs; preservatives; or other components in amounts safe for human ingestion. It is often desirable to incorporate lower molecular weight sugars, polydextroses and polyols such as glycerine and propylene glycol into the cholesteric liquid crystal solvent in order to lower water activity and, consequently, increase shelf life of the polymer liquid crystal-containing compositions. Suitable additives include sucrose, fructose, glucose, lactose, maltose, maltrin, dextrins, polydextrose and mixtures thereof in liquid or solid form. The level of salts and sugars which can be added is within the skill of one in the art. Too much salt or sugar can interfere with the ability of the solvent to solubilize the polymeric polysaccharide and thus, to form the liquid crystal.

The following tables indicate approximate one phase cholesteric liquid crystal concentrations for exemplary combinations of polysaccharides and solvents. These ranges are illustrative and can vary depending on a variety of factors, as disclosed herein.

TABLE I

| Polysaccharide | Solvent at 30° C. | Approx Single Phase Liquid Crystal Concentration range wt. % polysaccharide based on total liquid Crystal Weight - Range |
|---|---|---|
| Sodium Carboxymethylcellulose (D.S. = 1.74)[a] | water | 40-60% (a) |
| Sodium Carboxymethylcellulose (D.S. = 1.74)[a] | 2% aqueous NaCl | 50% (a) |
| Ethyl Cellulose (Hercules, Inc.) T-10 D.P. = 110) D.S. = 2.5+)[a] | $CH_3COOH$ | 50% (40-60) (a) |
| Hydroxypropyl Cellulose (KLUCEL G, Hercules, Inc. D.P. = 750)[a] | water | 30-50% (a) |
| *Hydroxypropyl Cellulose M.S. = 3.0) | water | 47-70% (*) 41-60% (b) |

[a]Values obtained from French Patent Publication 2,340,344, Manuel Panar and Oswin Burr Willcox published February 9, 1977.
*Values obtained from G. Conio et al., Macromolecules, 16, (8), 1264 (1983)
[b]R. S. Werbourwyji and D. G. Gray, Macromolecules 13, 69 (1980).
Approx single phase liquid is the onset of birefrigence under polarized light microscopy. It can be the beginning of the two phase (biphase), i.e. liquid crystals and istropic phase. Werbowyj and Gray reported the onset of one phase at 41%. Conio found the beginnings biphasic at 39%-47% and beginning one phase at 49% to 70%. Birefringence begins at 41% for Klucel E.

TABLE II

| Polymer | Solvent/ Room Temp. | (Single Phase Range) (approximate) |
|---|---|---|
| HPC (KLUCEL E) | Propylene Glycol | 35-60 |
| Guar Gum | Glycerin | 35-60 |

TABLE II-continued

| Polymer | Solvent/ Room Temp. | (Single Phase Range) (approximate) |
|---|---|---|
| Guar Gum 4413 | Water | 50–75% |
| HPC (KLUCEL E) | Water | 41–60 |
| Xanthan (Keltrol F)* | Water | 10–50% |

*Keltrol F - made by Kelco, San Diego, California MW approximately 1,000,000

C. Lipid Component

The lipid component of the low calories fat substitute of this invention can be a fat, oil, solid fat, synthetic fat or fat-like substance. The lipid component can be added to the polysaccharide polymer and solvent and then mixed until a homogeneous mixture is obtained and liquid crystals form, or it can be added to the liquid crystal composition.

The term "solid lipid" shall broadly include all those edible fats, oils and synthetic fats or fat-like substances, e.g., triglycerides, diglycerides, polyol polyesters and polycarboxylic acid esters which are solid at storage temperatures, preferably i.e., at any temperatures less than about 0° C., more preferably at less than about 5° C. for refrigerated food items and preferably less than about 40° C., more preferably 50° C., for shelf-storage items. Solid lipid additionally includes those fats or fat-like substances which are plastic. By "plastic," what is meant is a semi-solid fat which is spreadable, e.g. a shortening or margarine is plastic.

Generally, though not exclusively, the fat will be liquefiable, i.e., liquid, upon heating beyond the intended storage temperatures. Fats to be used which are solid at room temperature liquefy at temperatures encountered in cooking operations. Most cooking systems utilizing heated fats or oils operate at temperatures of from about 200° F. (about 93° C.) to about 500° F. (about 233° C.). For example, griddling operations utilize temperatures on the order of about 275° F. (about 128° C.) to about 400° F. (about 187° C.). In certain operations, such as deep fat frying, temperatures as high as about 400° F. (about 187° C.) and above are commonly employed. Polysaccharides incorporated in the liquid crystals which do not burn or char should be employed when high cooking temperatures, such as those employed during deep frying, are to be practiced.

Solid fats which can be utilized in compositions of the present invention include triglycerides having three $C_{12}$ to $C_{24}$ fatty acid moieties. These materials can be derived from plants or animals or can be edible synthetic fats or oils. For example, animal fats such as lard, tallow, oleo oil, oleo stock, oleo stearin and like, which are solid at room temperature can be utilized. Also, liquid oils, e.g., unsaturated vegetable oils, can be converted into plastic fats by partial hydrogenation of the unsaturated double bonds of the fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil.

Also suitable for use herein as the fat component are the so-called low molecular weight synthetic fats which are certain tri- or diglycerides in which one or two of the hydroxyl groups of the glycerine have been esterified with acetic, propionic, butyric or caprionic acids and one or two of the remaining hydroxyl groups of the glycerine have been esterified with higher molecular weight fatty acids having from 12 to 24 carbon atoms.

Other common types of fat include: cocoa butter and cocoa butter substitutes, such as shea and illipe butter; milk fats, such as butter fat; and marine oils which can be converted into plastic or solid fats such as menhaden, pilcherd, sardine, whale and herring oils.

Many classes of reduced calorie fat, fat-like substances, or mixtures thereof are suitable for use as part or all of the composition. Examples of such materials are: fatty alcohol esters of polycarboxylic acids (U.S. Pat. No. 4,508,746 to Hamm, 1985); fatty polyethers of polyglycerol (U.S. Pat. No. 3,932,532 of Hunter et al., 1976) (food use disclosed in German Patent 207,070, issued Feb. 15, 1984)); ethers and ether-esters of polyols containing the neopentyl moiety (U.S. Pat. No. 2,962,419 of Minich, issued Nov. 29, 1960); fatty alcohol diesters of dicarboxylic acids such as malonic and succinic acid (U.S. Pat. No. 4,582,927 of Fulcher, 1986); triglyceride esters of alpha branched chain-alkyl carboxylic acids (U.S. Pat. No. 3,579,548 of Whyte, 1971); fatty acid diglyceride, diesters of dibasic acids (U.S. Pat. No. 2,874,175 to Feuge et al.); polyorganosiloxanes (European Patent Application 205,273 to Frye); and alpha-acylated glycerides (U.S. Pat. No. 4,582,715 to Volpenheim). Also suitable for use as a fat substitute in the present invention are medium chain triglycerides, highly esterified polyglycerol esters, acetin fats, plant sterol esters, N-Oil, polyoxyethylene esters, jojoba esters, mono/diglycerides of fatty acids.

Synthetic solid fats which have been specifically tailored to provide calorie reduction benefits relative to conventional fats can be used. Of these, especially preferred are reduced calorie fats comprising at least about 15% by weight triglycerides selected from the group consisting of MML, MLM, LLM, and LML triglycerides, and mixtures thereof; wherein M = fatty acids selected from the group consisting of $C_6$ to $C_{10}$ saturated fatty acids, and mixtures thereof, and L = fatty acids selected from the group consisting of $C_{17}$ to $C_{26}$ saturated fatty acids, and mixtures thereof. A fat with the following fatty acid composition: (a) from about 15% to about 70% $C_6$ to $C_{10}$ saturated fatty acids; (b) from about 10% to about 70% $C_{17}$ to $C_{26}$ saturated fatty acids; (c) not more than about 10% fatty acids selected from the group consisting of $C_{12:0}$ and $C_{14:0}$, and mixtures thereof; (d) not more than about 20% fatty acids selected from the group consisting of $C_{18:1}$, $C_{18:2}$, $C_{18:3}$, and mixtures thereof; and (e) not more than 4% $C_{18:2}$ fatty acids is preferred.

Especially preferred fat-like materials onto which the polymer liquid crystal can adsorb include solid sucrose polyesters. Solid sucrose, polyesters, and processes for making them, are described in U.S. Pat. No. 4,005,195, Jandacek, issued Jan. 25, 1977, U.S. Pat. No. 3,600,186, Mattson et al., issued Aug. 17, 1971, U.S. Pat. No. 3,963,699, Rizzi et al., issued June 15, 1976, U.S. Pat. No. 4,518,772, Volpenheim, issued May 21, 1985, and U.S. Pat. No. 4,517,360, Volpenheim, issued May 14, 1985.

Sucrose polyesters that contain three or less fatty acid ester groups are digested and the products of digestion are absorbed from the intestinal tract much in the manner of ordinary triglyceride fats. However, sucrose fatty acid ester compounds that contain four or more fatty acid ester groups are substantially non-digestible and consequently non-absorbable by the human body. Solid sucrose polyesters can be used as an adsorption surface in reduced calorie fat compositions with or without the presence of conventional solid fat or other liquid crystal adsorption medium. It is not necessary that all of the hydroxyl groups of the sucrose be esterified with fatty acid, but it is preferable that the sucrose contain no more than three unesterified hydroxyl groups, and more preferably no more than two unesterified hydroxyl groups. Most preferably, substantially all of the hydroxyl groups of the sucrose are esterified with fatty acid, i.e., the compound is substantially completely esterified. Preferably at least about 85%, and most preferably at least about 95%, of the sucrose fatty acid polyesters are selected from the group consisting of octaesters, heptaesters and hexaesters, and mixtures thereof. Preferably, no more than about 35% of the polyesters are hexaesters of heptaesters, and at least about 60% of the polyesters are octaesters. Most preferably, at least about 70% of the polyesters are octaesters.

The fatty acids esterified to be sucrose molecule can be the same or mixed. The fatty acids groups esterified to the sucrose molecule must contain from about 8 to about 22 carbon atoms, and preferably from about 14 to about 18 carbon atoms. The fatty acids can be derived from naturally occurring or synthetic fatty acids; they can be saturated or unsaturated, including positional and geometrical isomers. Preferably, at least about 80%, and most preferably at least about 90%, of the fatty acids are selected from the group consisting of mixtures of palmitic, stearic, oleic, linoleic, and behenic acids.

If there is no other solid fat or solid material in the food, the sucrose polyesters used must have a solid component in order for the polymer liquid crystal to adsorb therein. Preferred sucrose polyesters are pseudoplastic at 100° F. (37.8° C.).

The solid fat compositions optionally contain liquid fats, i.e., oils; however, the composition will preferably maintain its essentially solid or plastic character. Additionally, the oil preferably will be well-dispersed throughout the composition such that it will not easily separate from the fat to form a separate layer.

Preparation of the Liquid Crystal

Formation of the liquid crystalline state and the concentration at which such liquid crystalline state occurs is dependent upon a variety of factors, including the specific types of polysaccharide and solvent, temperature and solubility of the polysaccharide in the solvent, and concentration of the polysaccharide. Characteristics of the polysaccharide which can affect the concentration level at which cholesteric liquid crystals can form include the degree and type of substitution and molecular weight. The liquid crystals of the present invention can be prepared by combining the polysaccharide and solvent together in the proper ratios. Formation of the cholesteric liquid crystalline state is accelerated by mechanical agitation and, in order to facilitate formation of a liquid crystal composition, mechanical agitation is preferred. Mixing, can be performed either by hand (i.e., using hand utensils) or with mechanical equipment useful for home, institutional, or industrial food preparation. One type of mixer which has been found to be suitable is a dough mixer; these types of mixers are often referred to as kneaders. Other applicable mixing equipment includes Planetary mixers and Hobard mixers. Extruders and other mixers which provide a shearing mixing can be used.

Generally liquid crystals are formed at room temperature or ambient temperatures. The processing temperature will depend somewhat on the properties of the solvent. However, processing temperatures in the range of 10° C. and 50° C. are used. For hydroxypropyl cellulose, this temperature range is from 25° C. to 45° C.

The onset of liquid crystal formation is characterized by a decrease in the viscosity of the mixture. As concentration of the polymer is increased, the composition will eventually form an essentially one phase liquid crystal composition. At higher concentrations a solid phase is formed. At higher concentrations and higher temperatures additional phases, such as gel and/or solid phases, can form in addition to or to the exclusion of the liquid crystal base. However, it is the one phase liquid crystal which is desired for the purposes of this invention and quantities and percentages of liquid crystal, as used herein, shall refer to a one-phase liquid crystal component of any composition.

Separation of the liquid crystal phase from excess liquid (solvent or solution) or solid may be achieved by ultracentrifugation. Ultracentrifugation should be conducted using sufficiently high centrifugal forces (preferably within the range of about 20,000 rpm to about 60,000 rpm) to induce the formation of observable phase boundaries for a long period of time (see Conio et al.) Under these conditions a good separation of isotropic and anisotropic phases is obtained. The volume of each phase is determined by calibration of the centrifuge tube and the volume fraction of isotropic phase thus calculated.

Identification of Liquid Crystals

Those skilled in the area of flowable lyotropic, polymeric liquid crystals will be able to identify cholesteric liquid crystals based upon known identification techniques.

As discussed in detail above, liquid crystal formation for any particular polymer and solvent combination is readily identified using one or more of several identification techniques. The onset of liquid crystal formation and the occurrence of a substantially one-phase liquid crystal state for a particular polymer and solvent system can be identified by: (1) visual observation with the naked eye, (2) birefringent optical activity observed by light microscopy; and/or (3) measurement of the polymer/solvent system NMR spectra; (4) measurement of apparent viscosity profile (described in more detail below); and (5) presence of a characteristic "texture" pattern observable under polarized light microscopy.

A general desciption of liquid crystalline structures has to include the physical structure on a molecular scale, which is characterized by the positional as well as the orientational order of neighboring molecules and the supermolecular arrangement of assemblies of molecules or parts of molecules. The supermolecular structure, which in polymer science is often called the morphology and which in the case of liquid crystalline phases is exclusively called the texture has also been characterized with respect to the positional and orientational order of the assemblies mentioned. The molecular structure and the texture of a mesophase determine the physical and technological properties of this phase. The observed textures are directly related to the molecular structure of the material. It is even possible to derive the molecular structure of the liquid crystalline modifications from the observations of the textures.

The textures of liquid crystalline phases determine the optical properties of these materials to a great extent. The wide range of applications of these systems depends on the ease with which textural changes and therefore changes in optical properties can be brought about by mechanical, thermal, electric and magnetic forces. The macroscopic orientations of the molecules in the sample determine the textures. In the case of the so-called homeotropic texture, the particles are arranged with their long axes parallel to the film normal throughout the macroscopic sample, whereas in the so-called homogeneous texture, the long axes are oriented parallel to the film surface. The textures of liquid crystalline phases are most conveniently studied by means of the polarizing microscope.

The light microscopy of liquid crystals is described generally in *The Microscopy of Liquid Crystals*, Norman, Hartshorn, London, England and Chicago, Ill., U.S.A., 1974. This reference book discusses birefringence which occurs for mesomorphic states and methods for microscopic observation and evaluation in Chapter 1, pp. 1–20, and specifically discusses cholesteric mesophase systems in Chapter 6, pp. 79–90, both sets of cited material being incorporated by reference herein. The phenomena of birefringence is a preferred method for determining occurrence of a liquid crystal for polysaccharides.

The different textures encountered in liquid crystalline phases will be described in detail. The following part is devoted to the description of the optical character of the textures observed for thin films between glass slides or for thin slices of a material under the polarizing microscope. The orientational order, which determines the textures, is also discussed.

I. In thin film samples of a nematic liquid crystalline material, one observes dark flexible filaments under the optical microscope. These are caused by lines of singularities in the molecular alignment. The term "black filaments" is used for this texture. A characteristic texture of the nematic phase is the "Schlieren texture," which is caused by a nonhomogeneous orientation of the particles of the material. One observes dark brushes that start from point defects. In a homeotropic texture, the field of view under the polarizing microscope is black in ideal cases. The optical axes and, consequently, the long axes of the molecules are oriented perpendicular to the plane of the thin films. The optical axes of the molecules are oriented parallel to the plane of the film if the samples exhibit the homogeneous texture. Under the microscope one observes large homogeneous birefringent regions. The nematic marbled texture consists substantially of a great number of nearly homogeneous regions with different orientation of the optical axes.

II. The most characteristic texture of the cholesteric phase is the "planar" texture, which is also called the "Grandjean" texture. It is characterized by the existence of a cholesteric single crystal where the direction of the helical axis is perpendicular to the plane of the film. The pitch of the helical structure, which determines the optical properties of the phase, can be influenced by temperature, additives, or external forces.

Just below the clearing point one may observe a texture in which the helical axis is parallel to the plane of the cholesteric film. One can directly observe the pitch of the helix, provided that it is large enough to be resolved. This texture has been referred to as "fingerprint" texture. In thicker samples the "focal conic" texture is usually obtained. Characteristic of this texture is the occurrence of an arrangement of fine dark lines. The lines form ellipses and hyperbolas or parts of ellipses and hyperbolas. The specific pattern is caused by the existence of a lamellar structure that can be deformed in such a way that the distance between the lamellar planes stays constant. In the case of the cholesteric phase the lamellar structure is due to the helical structure; it is thus a supermolecular structure.

III. Certain smectic (A and C) modifications also exhibit a focal conic texture. The lamellar structure is due to the smectic layers, thus it is a molecular structure. Focal conic textures can differ in their appearance. One distinguishes the fan-shaped, the broken fan-shaped, and the polygon textures. No focal conic textures are expected for one smectic (B) modification since the layers cannot be deformed. The smectic (C) modification can exhibit a Schlieren texture since the amount of the tilt of the long axes of the molecules is fixed at fixed temperatures, whereas the direction of the tilt may still vary.

The smectic (B) modification and also the other modifications can show a "mosaic" texture, where homogeneous regions with nonregular boundaries are observed under the polarizing microscope. The optical axes of all particles within one region are parallel; different regions have different orientations. Homeotropic and homogeneous textures are also observed for smectic phases. The optical pattern agrees with that described earlier.

Often observed with the naked eye in cholesteric phases are irridescent colors. The cholesteric phase is characterized by the fact that the direction of the long axes of the molecules change continuously within the samples. This leads to a twist about an axis perpendicular to the long axes of the molecules. If the pitch of the helical structure agrees with the wavelength of the visible light, selective reflection of monochromatic light can be observed. This effect leads to the irridescent colors often observed in the cholesteric phase.

Cholesteric polymer liquid crystals are also characterized by a distinctive viscosity profile as a function of concentration. A polymer/solvent mixture at lower polymer concentration forms an isotropic solution. As the concentration of the polymer increases, the viscosity of the solution first increases until it reaches a maximum viscosity peak; then the viscosity decreases dramatically with further increases of polymer concentration. It is understood by those skilled in the art that maximum viscosity peak signifies the presence of the polymeric lyotropic liquid crystalline order. On the other hand, polymer isotropic gels, polymeric isotropic solutions are characterized by increasing or stable viscosity with increasing polymer concentration. Simple mixtures of solid polymers and solvent do not have this viscosity profile. The changes in the viscosity are due to molecular alignment in the liquid crystal.

Preparation of Stable Polymeric Liquid Crystal Fat Substitute

Preferably the stable polymeric liquid crystal is prepared and then added to the lipid component. The polymeric liquid crystal is incorporated into the lipid by mixing. Any conventional mixing technique can be used, including extrusion. The liquid crystal and lipid are mixed until the combination appears to be a homogeneous solution.

An alternative method of preparing the liquid crystal is to mix the polysaccharide and the lipid and then add the solvent. This will form a stable polymeric liquid crystal within the lipid. The same types of agitation and shearing mixing are needed as to form the polymeric liquid crystal.

Addition of the stable polymeric liquid crystal to Foods

The stable polymeric liquid crystal can be used in foods in place of the lipid which is in the food. It can be substituted on a one to one basis, or can be used to dilute the fat or oil already present in the food. From 0.5% to 95% of the fat component can be replaced with the stable polymeric liquid crystal.

When the stable polymeric liquid crystal contains water, there may be some adjustment of the receipe or formulation required. The formulations can be adjusted without undue experimentation.

The preparation of several food items are discussed in more detail below.

The polysaccharide liquid crystals of the present invention can be incorporated into any edible food which contains a solid material and which is also fat-containing compositions as a partial substitute for solid or liquid fat component. The liquid crystal should be well mixed with the solid component of the composition. It is preferably to prepare the liquid crystal first, and then mix it with the solid, in order to most effectively achieve a microscopic distribution of the polymeric polysaccharide liquid crystal in said solid.

Starch can also function as the solid to which the fat substitute adsorbs. Starch is composed primarily of glucose and is derived from cereal grains. Common starches include starches derived from potato, wheat, corn, rice, maize, barley, rye and tapioca. Starches are comprised of both amylose and amylopectin. Both types of starches will function herein. Starches which are oxidized, bleached or otherwise modified, including pregelled starches can be used herein. Proteins can also function as the solid.

Shortening Compositions

Preferred solid or plastic fat for use in shortening compositions include hydrogenated and unhydrogenated animal or vegetable oils. Shortenings usually contain from about 1% to about 15% hardstock. Hardstock are triglycerides of long chain saturated fatty acids which have an Iodine Value of 15 or less. Tristearin, tripalmitan and triglycerides of palmitic and stearic acid are preferred hardstocks for use in shortenings. Other fatty acids can be present, usually the hardstock is made of fatty acids having from 12-22 carbon atoms. The triglyceride hardstock comprises from about 75% to about 100% by weight of beta tending triglyceride and from 0% to about 25% by weight of non-beta tending triglyceride. Preferably, the triglyceride hardstock is all beta tending triglyceride.

Suitable normally solid triglycerides having strong beta-forming tendencies include, for example, substantially completely hydrogenated triglyceride fats derived from soybean oil, hazelnut oil, lard, linseed oil, olive oil, peanut oil and sunflower seed oil. Substantially completely hydrogenated soybean oil, for example, soybean oil hydrogenated to an iodine value of less than about 10, is a suitable beta-tending triglyceride constituent.

The preferred shortening products of the present invention will contain little or substantially no solvent which is not incorporated into the liquid crystal. Preferably less than 10% of the solvent, based upon the total weight of solvent incorporated into a cholesteric liquid crystal form, is present in the fat products, more preferably, less than 1%, and most preferably, substantially no solvent (defined herein as being less than about 0.5%). While the presence of excess solvent is not preferred for the fat products, the presence of said solvents is still meant to be encompassed in said products, to the extent that the liquid crystal remains phase-stable.

The shortening compositions can also contain a stabilizer to protect against oxidative deterioration at high temperatures, such as increases in viscosity and fatty acid content, formation of polymerized fatty matter, increase in refractive index and destruction of tocopherols and intensification of foaming tendencies due to the formation of oxidized and polymerized constituents. Silicone oils, particularly methyl and ethyl silicones, are useful for this purpose. Suitable viscosities of the silicones are in the range of from about 50 to about 1,000,000, preferably from about 100 to about 1000 centistokes at 25° C. Silicone at a level of 0 to 10 ppm by weight, and 1 to 5 ppm by weight is preferred. Appropriate means must be used to assure substantially uniform dispersion of the small amount of silicone throughout the shortening composition. The silicone preferably is added to the starting material after completion of the refining, bleaching and optional deodorizing processes. Other antioxidants include butylhydroxyanisole and butyhydroxy toluem.

Various other additives can be used in the shortenings of this invention which are edible and aesthetically desirable and do not have a detrimental effect upon the melting and crystallization characteristics of the shortening. The types of additives employed should be consistent with the ultimate end use.

Margarine/Butter

Polysaccharide liquid crystals are effective fat substitutes for use in emulsified fat spreads, e.g., solid or semi-soft margarines, and butters. These are particularly useful in the manufacture of low-calorie margarine or butter compositions. Additionally, due to the ability of liquid crystals to adsorb onto solid fat and interfaces in margarine and butter, and the fact that the present liquid crystals forms lamellae in the continuous phase which can flow under application of shear, complex processing steps (e.g., heating, chilling, microparticulation of gels, etc.), conventionally utilized to produce stabilizing crystalline networks in margarine can be eliminated. The polysaccharides in their liquid crystalline form are homogeneously distributed on a microscopic level in the fat. Thus the absence of macroscopic clumps and particles reduces and spreads any inherent polysaccharide slimy taste and grittiness. The liquid crystals can be added to margarines and butters by simply mixing such liquid crystals with the margarine or butter in a softened, but preferably not liquified, state. Such margarine and butter compositions comprise from about 0.5% to about 80% of the polysaccharide liquid crystal, more preferably from about 1% to about 60%.

Any commercially available margarine or shortening can be used in conjunction with polysaccharide liquid crystals. Preferably, the non-dietary formulations, i.e., those without other added fat substitutes, are utilized.

Typically, conventional margarine comprises up to about 20% of an aqueous phase and from about 75% to about 90% of a fat phase, preferably at least about 80%. Spreads or diet products contain from 50% to 80% fat phase and 20% to 50% water.

The aqueous phase usually contains milk or milk solids. The milk component can be derived from whole milk, low-fat milk (about 2% butterfat content), skim milk or nonfat dry milk solids. The amount of milk and/or milk solids (in terms of % by weight solids) usually ranges from about 0.5% to about 5% by weight of the emulsified spread, and more typically from about 1% to about 3% by weight. Particularly where milk solids are used, water, typically in the form of distilled or deionized water is included as part of the aqueous phase. For a non-browning spread, the milk solids or reducing sugars in them are eliminated.

Other ingredients included within the aqueous phase are flavorants such as salt and other water-soluble flavors. Usually, salt is included in an amount of from about 0.5% to about 3.5% by weight of the emulsified spread, and more typically in an amount of from about 1% to about 2.5% by weight. The amount of the other water-soluble flavors depends upon the particular flavor characteristics desired.

Another important component of the aqueous phase are the preservatives, for example, citric acid, potassium sorbate and sodium benzoate. The preservatives are added in amounts effective to prevent oxidation, bacterial and mold growth.

Margarine fats are usually made from triglycerides which have predominantly long chain length fatty acids (e.g., palmitic, stearic, oleic and/or linoleic residues). These long chain fatty acid triglycerides can be interesterified to provide margarine fats having different melting profiles. More typically, the long chain fatty acid triglyceride is a hydrogenated (hardened) oil. See *Bailey's Industrial Oil and Fat Products*, supra, at page 339.

Improved margarine fat phases (also useful for other emulsified spreads) are disclosed in U.S. Pat. No. 4,388,339 to Lomneth et al, (1983).

Methods for making and processing margarine are well known in the art and one method is also disclosed in U.S. Pat. No. 4,388,339.

Other ingredients can be present in the oil phase. One particularly important ingredient is the emulsifier. Emulsifiers which can be used include mono- and diglycerides (water-in-oil stabilizers and baking aids), lecithin (oil-in-water stabilizer, as well as anti-stick and anti-spatter agent), and polyoxyethylene sorbitan monoesters such as TWEEN 60 and TWEEN 80 (oil-in-water stabilizers). Other conventional emulsifiers can also be used. The emulsifiers are added in amounts of from about 0.01% to about 10% by weight of the spread, and preferably in an amount of from about 0.1% to about 0.5% by weight. Coloring agents such as betacarotene and oil soluble flavors can be in the oil phase. The amount of colors and flavors depends upon the color and flavor characteristics desired and is within the skill of the art.

The polysaccharide liquid crystal is added into the margarine, fat, or other emulsified fat spread by mixing.

Protein-based Polysaccharide Liquid Crystal Adsorption Surface Products

The polymer liquid crystals can be used to reduce the amount of fats in a variety of foods with solid adsorption surfaces other than, or in addition to, solid fats. In such products, the level of liquid fats or oils can be reduced through the use of the present fat substitutes. These include a variety of protein-containing food products which naturally and/or conventionally include liquid fats. Such proteins include a variety of vegetative proteins such as those found in peanuts, sesame seeds, sunflower seeds, Brazil nuts, hazel nuts, almonds, walnuts, pumpkin seeds, macadamia nuts, and filberts. Other sources of vegetative protein include soybeans, sunflowers, and other legumes and beans.

The present invention, accordingly, further relates to edible protein- and oil-containing compositions which comprise from about 10% to about 90% of an oil, from about 90% to about 10% of a protein component, and from about 2% to about 75% of an edible polysaccharide liquid crystal. It has been found that the amount of oil in these protein-containing products can be reduced while still retaining good mouthfeel and taste characteristics by substituting a portion of the oil with a polysaccharide liquid crystal.

The polysaccharide liquid crystal can be incorporated into the product by mixing it with the protein component. The fat (solid or liquid) can be present during incorporation of the liquid crystal or can be added afterward.

The fat substitutes of the present invention can be added to a wide variety of edible fat-containing products alone or in the making of baked goods or baking mixes, such as for cakes, brownies, muffins, cookies, bar cookies, wafers, biscuits, pastries, pies and pie crusts. Cookies include, for example, the storage-stable dual-textured cookies described in U.S. Pat. No. 4,455,333 of Hong & Brabbs. The baked goods can contain fruit, cream or other fillings. Other baked good applications include breads and rolls, crackers, pretzels, pancakes, waffles, ice cream cones and cups, yeast-raised baked goods, pizza crusts and baked farinaceous snack foods.

Among the many other uses for the present liquid crystals are the production of sweet goods and confections, for example, chocolates, chocolate confections, frostings and icings, whipped toppings (frozen or aerosol) and cream fillings. ice cream fruit fillings and other fillings. The consistency of liquid crystal can vary depending upon the particular product, but will generally be between about 0.1% and 60% of the total weight of the product or product component to which it is added. The liquid crystal-containing fat materials are useful in various kinds of dips, sauces (e.g., tarter sauce and barbecue sauce). Also, the liquid crystals can be used as partial substitutes for fat materials in cooking sprays and egg substitutes. The liquid crystals stabilize or thicken these products and thus lower caolories.

The fat substitute of the present invention are also useful in combination with particular classes of food and beverage ingredients. For example, an extra calorie reduction benefit is achieved when such fat materials are used with noncaloric or reduced calorie sweeteners. Examples of sweeteners are aspartame, saccharin, acesulfame, alatane, thaumatin, dihydro-chalcones, cyclamate, stevioside, synthetic alkoxy aromatics, such as dulcin and P-4000. suosan, miraculin, monellin, cyclohexylsulfamates, substituted imidazolines, N-substituted sulfamic acids, oximes, acesulfam-K and rebaudioside-A and peptides.

A variety of product executions of the present invention are exemplified below. These examples are not meant to define or otherwise limit the scope of the invention. Rather, the scope of the invention is to be ascertained according to the claims which follow the examples.

EXAMPLE I

| Preparation of Liquid Crystals | |
|---|---|
| Ingredient | Amount (% By Weight) |
| Klucel E | 42 |
| Water | 58 |

Liquid crystals are formed by mixing the above ingredients together until the mixture is homogeneous, birefringent under polarized light microscopy and the viscosity changes to a flowable mixture.

EXAMPLE II

| Preparation of Liquid Crystals | |
|---|---|
| Ingredient | Amount (% By Weight) |
| Xanthan | 2 |
| E Klucel | 30 |
| Water | 68 |

Liquid crystals are formed by mixing the above ingredients together until the mixture is homogeneous and the viscosity changes to a flowable mixture.

EXAMPLE III

| Preparation of Fat Substitute | |
|---|---|
| Ingredient | Amount (% By Weight) |
| Crisco Shortening | 66 |
| Liquid crystal from Example 1 | 34 |

The liquid crystal from Example I is mixed with the shortening and until a homogeneous blend is made. This shortening is then used in baking.

A fat substitute is prepared from the liquid crystals of Example II in the same manner.

EXAMPLE IV

| Preparation of a white cake | |
|---|---|
| Ingredient | Amount (Weight per gram) |
| fat substitute | 98 |
| sugar | 267 |
| flour | 214 |
| salt | 6 |
| baking powder | 13.3 |
| whole milk | 261 |
| egg white | 120 |
| vanilla | 5 |

The following fat substitutes are used. Each liquid crystal was mixed at a level of 34% in Crisco ® shortening.

| Liquid Crystal Ingredients | Amount |
|---|---|
| Sample A | |
| Xanthan | 2 |
| Klucel E | 30 |
| Water | 68 |
| Sample B | |
| Klucel E | 42 |
| Water | 58 |
| Sample C | |
| Viscarin 328 | 10 |

-continued

| Liquid Crystal Ingredients | Amount |
|---|---|
| Klucel E | 10 |
| Water | 80 |

Viscarin is a carrageenan from FMC, Marine Colloids, Philadelphia.

Three cakes are prepared using the fat substitutes in place of the Crisco shortening. The cakes are prepared by blending the flour, sugar, salt, and baking powder for 30 seconds at slow speed. The fat and 180 gm of the milk are added an the mixture mixed at two minutes at medium speed. The egg whites, remaining milk and vanilla are added and the mixture is mixed for two minutes at medium speed. The batter is baked in an 8 inch cake pan (435 gm) at 350° F. for 35-40 minutes. The cake is cooled for 10 minutes and the height is measured and the cake is removed from the pan.

| Sample | Density (Batter) | Viscosity (Batter) | Center Height | Edge Height |
|---|---|---|---|---|
| Control | 0.673 | 25.0 | 1.39 | 1.13 |
| A | 0.692 | 19.0 | 1.61 | 1.14 |
| B | 0.740 | 15.6 | 1.59 | 1.23 |
| C | 0.720 | 14.5 | 1.48 | 1.1 |

EXAMPLE V

| Preparation of Fat Substitute With Preservatives | |
|---|---|
| Ingredient | Amount (% By Weight) |
| Klucel E | 15 |
| glycerine | 6 |
| water | 9 |
| shortening | 70 |

The fibers are added to the glycerine and water under high shear. When the liquid crystals are formed, the shortening is added and mixed until homogeneous. This shortening substitute is stable to bacterial growth.

When citric acid and potassium sorbate are used in place of the glycerine, similar results are obtained.

EXAMPLE VI

| Preparation of Fat Substituted Peanut Butter | |
|---|---|
| Ingredient | Amount (% By Weight) |
| Liquid Crystal | 25 |
| polydextrose (Pfizer) | 20 |
| sodium chloride | 5 |
| honey | 65 |
| xanthan | 10 |
| peanut solids | 50 |
| peanut oil | 25 |

The liquid crystal is formed by high shear mixing of the ingredients. This material is than added to the peanut solids and peanut oil and a peanut butter is made. The peanut solids are ground full fat peanuts. When low fat peanut solids are used, the fat content has to be adjusted to make the product more lubricious.

EXAMPLE VI

| Preparation of Sugar Cookies | |
|---|---|
| Ingredient | Amount (weight gm) |
| Fat substitute | 196 |
| Sugar | 300 |
| Egg | 96 |
| Vanilla | 4 |
| Flour | 275 |
| Salt | 2.5 |
| Baking soda | 4 |

The following fat substitutes are used. The liquid crystal was mixed at a level of 34% in Crisco shortening.

| Liquid Crystal Ingredients | Amount |
|---|---|
| Sample H | |
| Klucel E | 42 |
| Water | 58 |

The cookies are prepared using the fat substitute in place of the Crisco shortening. The cookies are prepared by:

Creaming fat substitute and sugar for 1½ minutes with a Sunbeam Mixmaster at speed #7 scraping frequently.

Adding eggs and vanilla, then continuing mixing at speed #7 for another 1½ minutes.

Adding sifted flour, salt and baking soda ⅓ at a time and blending each increment in by hand.

Using a size 70 food scoop, drop 12 cookies, evenly spread, on a sheet.

Baking for 10½ minutes at 375° F. (high bottom, medium top heat) oven setting.

After baking the sheet is removed from oven and allowed to cool for exactly one minute before removing the cookies. (This is especially important because cookies continue baking after removal from the oven when left on cookie sheet.)

After cooling, evaluation of the cookies diameter, thickness, flavor and eating quality is made

| | Average 12 Cookies Diameter | Average 6 Cookies Thickness | % Fiber | % H₂O | % Shortening |
|---|---|---|---|---|---|
| Control | 3.15 | 0.48 | — | — | 100 |
| Sample H | 2.9 | 0.52 | 14.28 | 19.72 | 66 |

| | Crispiness | Dissipation | Moistness | Cakiness Chewiness | Color |
|---|---|---|---|---|---|
| | | Scale 0-10 | | | |
| Control | 6.2 | 5.8 | 4.8 | 5.2 | Just right |
| Sample H | 6.8 | 5.2 | 5 | 5.4 | Just right |

In a panel sample H was found to be liked very much exactly like control (both are 8.2 out of 10).

EXAMPLE VII

| Preparation of Rolled Biscuits | |
|---|---|
| Ingredients | Amount (Weight gm) |
| Fat substitute | 65 |
| Flour | 220 |
| Baking powder | 13.3 |
| Salt | 5 |
| Whole Milk | 160 |

The following fat substitutes are used. Each liquid crystal was mixed at a level of 34% in Crisco shortening.

| Liquid Crystal Ingredients | Amount (percent) |
|---|---|
| Sample A | |
| Xanthan | 5 |
| Klucel E | 20 |
| Water | 75 |
| Sample B | |
| Klucel E | 42 |
| Water | 58 |

The biscuits are prepared using the fat substitutes in place of the Crisco shortening. The biscuits are prepared by:

Cutting fat into sifted flour, baking powder and salt mixture with pastry blender until it looks like coarse cornmeal.

Removing one cup of dry mixture to small bowl and blend with milk just enough to hold dough together.

Combining remainder of dry mixture with dough.

Transferring to lightly floured board.

Kneading lightly about 4 times.

Rolling dough ½ inch thick and cut with flour cutter.

Placing on cookie sheet and baking at 425° F. for 10-10½ minutes.

Color, texture and eating quality were judged subjectively.

| | Color | Texture | Eating Quality |
|---|---|---|---|
| Control | 8.3 | 7.7 | 8.2 |
| Sample A | 7.8 | 5.5 | 5.7 |
| Sample B | 8.3 | 5.5 | 6 |

EXAMPLE VIII

| Preparation of Frostings | |
|---|---|
| Ingredient | Amount (Weight gm) |
| Fat substitute | 73 |
| Confectioners sugar | 440 |
| Whole milk | 90 |
| Vanilla | 5 |

The following fat substitutes are used. Each liquid crystal was mixed at a level of 34% in Crisco or Sweetex shortening.

| Liquid Crystal Ingredients | Amount (Percent) |
|---|---|
| Sample A | |
| Klucel E | 42 |
| Water | 58 |
| Sample B | |
| Xanthan | 5 |
| Klucel E | 20 |

| Liquid Crystal Ingredients | Amount (Percent) |
|---|---|
| Water | 75 |

The two frostings are prepared using the fat substitutes in place of the shortening. The frostings are prepared by mixing the powdered sugar, fat substitute, vanilla and milk for 2 minutes at medium speed, scraping frequently. The frosting is then placed in an air-tight container and stored in the refrigerator for 24 hours. The frosting tastes equivalent to that made with shortening.

What is claimed is:

1. A fat substitute comprising:
   (a) from about 0.5% to about 99.5% of a lipid selected from the group consisting of fat, oil, synthetic fat and mixtures thereof; and
   (b) from about 0.5% to about 99.5% of a stable polymeric liquid crystal consisting essentially of:
      (1) from about 10% to about 90% of a solvent; and
      (2) from about 10% to about 90% of a polysaccharide having a molecular weight of from about 500 to about 1,000,000.

2. A food in which from 0.5% to 100% of the lipid is replaced by a fat substitute according to claim 1.

3. A food according to claim 2 wherein said solvent is a polar solvent.

4. A food according to claim 3 wherein said solvent is water.

5. A food according to claim 4 wherein said polysaccharide has a molecular weight of from about 2500 to about 1,000,000.

6. A food according to claim 3 wherein said polysaccharide is selected from the group consisting of substituted cellulose, cellulose-derivative polymers, hydrocolloids and polyglucose materials.

7. A food according to claim 6 wherein said lipid is selected from the group consisting of hydrogenated and unhydrogenated vegetable oils, animal oils or fats, marine oils and mixtures thereof.

8. A food according to claim 7 wherein said lipid is selected from the group consisting of canola oil, palm oil, hydrogenated or unhydrogentated soybean oil, cottonseed oil, rapeseed oil, coconut oil, corn oil, peanut oil and mixtures thereof.

9. A food according to claim 8 wherein said solvent is a flavor oil.

10. A food according to claim 8 wherein said polysaccharide is selected from the group consisting of methyl cellulose, ethyl cellulose, ethyl hydroxyethyl cellulose, hydroxypropyl cellulose, sodium carboxymethyl cellulose, hydroxypropylmethyl cellulose, ethylmethyl cellulose, guar gum derivatives, xanthan gum, psyllium gum, alginate, locust bean gum and mixtures thereof.

11. A food according to claim 10 wherein said polysaccharide is selected from the group of methyl cellulose, hydroxypropyl cellulose, xanthan, alginates, and mixtures thereof.

12. A food according to claim 11 wherein said fat is a synthetic fat selected from the group consisting of polyol polyesters of medium and long chain fatty acids.

13. A low calorie, fiber containing baking mix comprising:
   (a) from about 5% to about 75% fat substitute according to claim 1;
   (b) from about 10% to about 40% sugar;
   (c) from about 10% to about 50% flour;
   (d) from about 0.1% to about 3% leavening; and
   (e) from about 0.1% to about 5% flavoring.

14. A low calorie, fiber containing margarine comprising:
   (a) from about 5% to about 90% fat substitute according to claim 1;
   (b) from about 10% to about 15% water; and
   (c) from 0% to about 3% emulsifier.

15. A protein and oil containing food comprising:
   (a) from about 10% to about 90% protein;
   (b) from about 2% to about 75% of a fat substitute according to claim 1, and
   (c) from about 10% to about 90% oil.

16. A food according to claim 14 wherein the protein and oil are derived from nuts or oilseeds.

17. A food according to claim 15 wherein the nut is peanut and the food is peanut butter.

18. A food according to claim 16 wherein said liquid crystal consists of a mixture of xanthan, polydextrose, honey and sodium chloride.

19. A food according to claim 5 which is selected from the group consisting of cakes, margarine, shortening, confection, nut butters, nut spreads, frostings, mousse, whipped cream, cookies and biscuits.

20. A food according to claim 12 wherein said polyol polyester comprises a mixture of sucrose polyesters, at least 85% of which are selected from the group consisting of octaesters, heptaesters, hexaesters and mixtures thereof, of sucrose and saturated or unsaturated fatty acids having from 14 to 22 carbon atoms.

21. A food according to claim 19 wherein said fatty acid is selected from the group consisting of palmitic, stearic, oleic, linoleic and behenic.

22. A low calorie shortening comprising:
   (a) from about 1% to about 15% hardstock;
   (b) from about 10% to about 50% of a fat substitute according to claim 1 wherein said solvent is less than 10%; and
   (c) from about 90% to about 35% lipid.

23. A shortening according to claim 22 wherein said solvent is less than 1%.

24. A shortening according to claim 23 wherein said lipid is selected from the group consisting of hydrogenated and unhydrogenated vegetable oils, animal oils or fats, marine oils and mixtures thereof.

25. A shortening according to claim 24 wherein said polysaccharide is selected from the group consisting of methyl cellulose, ethyl cellulose, ethyl hydroxyethyl cellulose, hydroxypropyl cellulose, sodium carboxymethyl cellulose, hydroxypropylmethyl cellulose, ethylmethyl cellulose, guar gum, xanthan gum, psyllium gum, alginate, locust bean gum and mixtures thereof.

26. A fat substitute according to claim 1 comprising from about 10% to about 90% of said polymeric liquid crystal.

* * * * *